United States Patent
Tang

(10) Patent No.: US 12,314,209 B2
(45) Date of Patent: May 27, 2025

(54) METHOD FOR DATA TRANSMISSION, TERMINAL DEVICE AND NON-TRANSITORY COMPUTER-READABLE STORAGE MEDIUM

(71) Applicant: PAX COMPUTER TECHNOLOGY (SHENZHEN) CO., LTD., Shenzhen (CN)

(72) Inventor: Zenghong Tang, Shenzhen (CN)

(73) Assignee: PAX COMPUTER TECHNOLOGY (SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 18/286,278

(22) PCT Filed: Mar. 15, 2022

(86) PCT No.: PCT/CN2022/080801
§ 371 (c)(1),
(2) Date: Oct. 10, 2023

(87) PCT Pub. No.: WO2022/227895
PCT Pub. Date: Nov. 3, 2022

(65) Prior Publication Data
US 2024/0370399 A1    Nov. 7, 2024

(30) Foreign Application Priority Data
Apr. 27, 2021   (CN) .......................... 202110459035.1

(51) Int. Cl.
*G06F 13/42* (2006.01)
*G06F 11/30* (2006.01)

(52) U.S. Cl.
CPC ...... *G06F 13/4282* (2013.01); *G06F 11/3051* (2013.01)

(58) Field of Classification Search
CPC .......................... G06F 13/4282; G06F 11/3051
See application file for complete search history.

(56) References Cited

U.S. PATENT DOCUMENTS

2016/0127954 A1\*   5/2016   Zhou ................. H04W 28/0268
                                                              370/231
2019/0303210 A1    10/2019   Enami et al.
(Continued)

FOREIGN PATENT DOCUMENTS

CN          110831061 A        2/2020
CN          112199052 A        1/2021
(Continued)

OTHER PUBLICATIONS

F. Y. Okay and S. Ozdemir, "Routing in Fog-Enabled IoT Platforms: A Survey and an SDN-Based Solution," in IEEE Internet of Things Journal, vol. 5, No. 6, pp. 4871-4889, Dec. 2018, doi: 10.1109/JIOT.2018.2882781. (Year: 2018).\*
(Continued)

*Primary Examiner* — Eric T Oberly
(74) *Attorney, Agent, or Firm* — CANTOR COLBURN LLP

(57) ABSTRACT

A method for data transmission is applied to a first terminal device configured to store data received from a second terminal device into a cache space of the first terminal device, and transmit the data stored in the cache space to a third terminal device. This method includes: obtaining a target value of the amount of data transmission when a data read event is monitored; determining, if the target value of the amount of data transmission is greater than a value of an amount of cached data, a theoretical transmission time according to the target value of the amount of data transmission and the value of the amount of cached data; transmitting data to the third terminal device according to the
(Continued)

target value of the amount of data transmission and the value of the amount of cached data within a range of the theoretical transmission time.

17 Claims, 3 Drawing Sheets

(56) References Cited

U.S. PATENT DOCUMENTS

2021/0365379 A1* 11/2021 Creed ..................... G06F 9/505
2023/0292315 A1    9/2023 Li et al.

FOREIGN PATENT DOCUMENTS

| | | | |
|---|---|---|---|
| CN | 112532592 A | 3/2021 |
| CN | 113157625 A | 7/2021 |

OTHER PUBLICATIONS

International Search Report dated Jun. 6, 2022; International Application No. PCT/CN2022/080801; 2 pages (English).
International Search Report dated Jun. 6, 2022; International Application No. PCT/CN2022/080801; 3 pages (non-English).
Written Opinion dated Jun. 6, 2022; International Application No. PCT/CN2022/080801; 4 pages (non-English).

* cited by examiner

METHOD FOR DATA TRANSMISSION, TERMINAL DEVICE AND NON-TRANSITORY COMPUTER-READABLE STORAGE MEDIUM

CROSS-REFERENCE TO RELATED APPLICATIONS

This application is a 35 U.S.C. § 371 national stage application of PCT patent application No. PCT/CN2022/080801, filed on Mar. 15, 2022, which claims priority to Chinese patent application No. 202110459035.1, filed on Apr. 27, 2021, the entire contents each of which are incorporated herein by reference.

FIELD

The present application relates to the field of data processing technologies, and more particularly, to a method for data transmission, a terminal device and a computer-readable storage medium.

BACKGROUND

Serial port communication is a common serial communication mode between terminal devices, in this communication mode, data is transmitted according to bit sequence, this communication mode is characterized in that, the communication line is simple, and a bidirectional communication may be implemented only through one pair of transmission lines, the communication cost is reduced accordingly. Thus, serial port communication is widely used in the field of communications.

The existing serial port communication method has the following problems: firstly, since the serial port is an asynchronous communication interface, a situation of losing of communication data due to too heavy load is prone to occur at a data receiving terminal; secondly, if data is not timely transmitted due to the fact that a data transmitting terminal is too heavy, the data receiving terminal is always in the state of waiting for receiving data, and thus cannot perform subsequent data processing tasks, a poor data transmission sensitivity is caused. Thus, how to reduce a data loss rate, improve the reliability of communication and improve the sensitivity of data transmission is the problem that needs to be solved urgently through a serial port communication method.

SUMMARY

Embodiments of the present application provide a method for data transmission, a terminal device and a non-transitory computer-readable storage medium that can reduce the data loss rate, improve the reliability of communication and improve the sensitivity of data transmission.

According to the first aspect, a method for data transmission is provided in one embodiment of the present application. This method is applied to a first terminal device, the first terminal device is configured to store data received from a second terminal device in a cache space of the first terminal device, and transmit the data stored in the cache space to a third terminal device. The method includes:

obtaining a target value of the amount of data transmission from the third terminal device when a data read event is monitored; where the target value of the amount of data transmission indicates a value of an amount of data requested to be acquired, and the target value of the amount of data transmission is sent from the third terminal device to the first terminal device;

determining, if the target value of the amount of data transmission is greater than a value of an amount of cached data, a theoretical transmission time according to the target value of the amount of data transmission and the value of the amount of cached data; where the value of the amount of cached data is the value of the amount of data cached in the cache space of the first terminal device, and the theoretical transmission time represents a theoretical period of time for transmitting data having the target value of the amount of data transmission to the third terminal device; and transmitting data to the third terminal device according to the target value of the amount of data transmission and the value of the amount of cached data within a range of the theoretical transmission time.

In this embodiment of the present application, the first terminal device serves as a data transmission medium of the second terminal device and the third terminal device, and uses cache space thereof to realize traffic control in data transmission. Thus, the condition of communication data loss caused due to too heavy load in the data transmission process can be effectively avoided. In addition, in the data transmission process, the theoretical transmission time for data transmission is determined according to the target value of the amount of data transmission and the value of the amount of cached data, and the data transmission time is controlled within the theoretical transmission time. In this way, the condition that the data receiving terminal is always in the waiting state because that the transmitting terminal does not transmit data in time in the data transmission process is effectively avoided. By means of the aforesaid method for data transmission, the data loss rate in the data transmission process is effectively reduced, the reliability of data transmission is improved, and the sensitivity of data transmission is improved simultaneously.

In one embodiment, said determining the theoretical transmission time according to the target value of the amount of data transmission and the value of the amount of cached data includes:

obtaining a plurality of communication parameters between the first terminal device and the second terminal device;

determining a data amount difference value between the target value of the amount of data transmission and the value of the amount of cached data; and determining the theoretical transmission time according to the communication parameters and the data amount difference value.

In one embodiment, the communication parameters includes a baud rate and a number of data bits included in each frame of data;

said determining the theoretical transmission time according to the communication parameters and the data amount difference value includes:

determining a unit transmission time between the first terminal device and the second terminal device according to the baud rate and the number of data bits included in each frame of data; where the unit transmission time represents a time for transmitting each frame of data; and determining the theoretical transmission time according to the unit transmission time and the data amount difference value.

In one embodiment, the communication parameters further include a tolerance time;

said determining the theoretical transmission time according to the unit transmission time and the data amount difference value includes:
  determining a first transmission time according to the data amount difference value and the unit transmission time; and
  determining the theoretical transmission time according to the first transmission time and the tolerance time.

In one embodiment, said transmitting the data to the third terminal device according to the target value of the amount of data transmission and the value of the amount of cached data within the range of the theoretical transmission time includes:
  obtaining, when a second instruction is monitored, a current value of an actual amount of data transmission and the value of the amount of cached data within the range of the theoretical transmission time, wherein a value of the actual amount of data transmission represents a value of an amount of data that has been transmitted to the third terminal device through the first terminal device;
  determining a remaining amount of data transmission according to the target value of the amount of data transmission and the actual amount of data transmission; and
  transmitting, if the remaining amount of data transmission is less than or equal to the value of the amount of cached data, first M frames of data in the cache space to the third terminal device, updating the value of the amount of cached data, and terminating data transmission; where M is the remaining amount of data transmission; or alternatively,
  transmitting, if the remaining amount of data transmission is greater than the value of the amount of cached data, Q frames of data in the cache space to the third terminal device, updating the value of the amount of cached data, and continuing to monitor the second instruction; where Q is the value of the amount of cached data.

In one embodiment, after said determining the theoretical transmission time according to the target value of the amount of data transmission and the value of the amount of cached data, the method further includes:
  determining whether the current value of the actual amount of data transmission reaches the target value of the amount of data transmission when the theoretical transmission time is reached; where the value of the actual amount of data transmission represents the value of the amount of data transmitted to the third terminal device through the first terminal device; and
  transmitting, if the actual amount of data transmission does not reach the target value of the amount of data transmission, preset timeout information to the third terminal device, and monitoring the data read event again.

In one embodiment, after obtaining the target value of the amount of data transmission, the method further includes:
  transmitting, if the target value of the amount of data transmission is less than or equal to the value of the amount of cached data, first N frames of data in the cache space to the third terminal device; wherein N is the target value of the amount of data transmission.

In one embodiment, the method further includes:
  obtaining an amount of data to be transmitted when a third instruction is monitored; where the amount of data to be transmitted is an amount of data requested to be transmitted, which is sent by the second terminal device to the first terminal device;
  receiving C1 frames of data from the second terminal device if a sum of the amount of data to be transmitted and the value of the amount of cached data is greater than a memory size of the cache space; where C1 is a difference value between the memory size of the cache space and the value of the amount of cached data; and
  storing the C1 frames of data in the cache space, and updating the value of the amount of cached data.

According to the second aspect, a terminal device is provided in one embodiment of the present application. The terminal device includes a memory, a processor and a computer program stored in the memory and executed by the processor. The processor is configured to, when executing the computer program, implement the aforesaid method for data transmission.

According to the third aspect, a non-transitory computer-readable storage medium is provided in one embodiment of the present application. The non-transitory computer-readable storage medium store a computer program, that, when executed by a processor, causes the processor to implement the aforesaid method for data transmission.

According to the fourth aspect, a computer program product is provided in one embodiment of the present application. When the computer program product is executed on the terminal device, the terminal device is caused to implement the aforesaid method for data transmission.

It can be understood that, regarding the beneficial effects in the second aspect, the third aspect, and the fourth aspect, reference can be made to the relevant descriptions in the first aspect. The beneficial effects in the second aspect, the third aspect, and the fourth aspect are not repeatedly described herein.

DESCRIPTION OF THE DRAWINGS

In order to describe the embodiments of the present application more clearly, a brief introduction regarding the accompanying drawings that need to be used for describing the embodiments of the present application or the existing technologies is given below. It is obvious that the accompanying drawings described below are merely some embodiments of the present application, a person of ordinary skill in the art can also acquire other drawings according to these drawings without paying creative efforts.

DETAILED DESCRIPTION OF EMBODIMENTS

In the following descriptions, in order to describe but not intended to limit the present application, concrete details including specific system structure and technique are proposed to facilitate a comprehensive understanding of the embodiments of the present application. However, a person of ordinarily skill in the art should understand that, the present application can also be implemented in some other embodiments without these concrete details. In other conditions, detailed explanations of method, circuit, device and system well known to the public are omitted, so that unnecessary details which are disadvantageous to understanding of the description of the present application may be avoided.

It should be understood that, when a term "comprise/include" is used in the description and annexed claims, the term "comprise/include" indicates existence of the described characteristics, integer, steps, operations, elements and/or components, but not exclude existence or adding of one or more other characteristics, integer, steps, operations, elements, components and/or combination thereof.

It should be further understood that, terms "and/or" used in the description and the annexed claims of the present application are referred to as any combination of one or a plurality of listed item(s) associated with each other and all possible items, and including these combinations.

As is used in the description and the annexed claims, a term "if" may be interpreted as "when" or "once" or "in response to determination" or "in response to detection" according to the context.

In addition, in the descriptions of the present application, terms such as "first" and "second", "third", etc., are only used for distinguishing purpose in description, but shouldn't be interpreted as indication or implication of a relative importance.

The descriptions of "referring to one embodiment" or "referring to some embodiments", or the like as described in the specification of the present application means that a specific feature, structure, or characters which are described with reference to this embodiment are included in one embodiment or some embodiments of the present application. Thus, the sentences of "in one embodiment", "in some embodiments", "in some other embodiments", "in other embodiments", and the like in this specification are not necessarily referring to the same embodiment, but instead indicate "one or more embodiments instead of all embodiments", unless otherwise they are specially emphasize in other manner.

Figure 1:
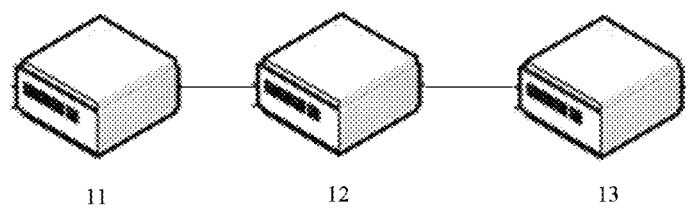
FIG. 1 illustrates a schematic diagram of a data transmission system provided by one embodiment of the present application.

First, one application scenario of a method for data transmission provided in one embodiment of the present application is described. Referring to FIG. 1, FIG. 1 illustrates a schematic diagram of a data transmission system according to one embodiment of the present application. As shown in FIG. 1, the data transmission system includes a first terminal device 11, a second terminal device 12, and a third terminal device 13. The first terminal device 11 includes a cache space, and the cache space may refer to a physical storage device (e.g., a memory, a hard disk, etc.) having a data storage function in the first terminal device, or refer to one storage area on one certain physical storage device in the first terminal device (e.g., a partition disk after the hard disk is partitioned, etc.). The cache space may also refer to a software storage process operating on one certain physical storage device in the first terminal device, and may also refer to a file (e.g., a data packet, etc.) stored in one certain physical storage device in the first terminal device. Certainly, the cache space may also be a third-party physical storage device (e.g., an external hard disk, or the like) in communication connection with the first terminal device.

The first terminal device is configured to store the data received from the second terminal device into the cache space thereof, and transmit the data stored in the cache space to the third terminal device. For example, in a data transmission process, the second terminal device transmits a data transmitting request to the first terminal device. After receiving the data transmitting request, the first terminal device receives the data from the second terminal device and caches the received data into the cache space of the first terminal device. When the third terminal device needs to obtain the data from the first terminal device, the third terminal device transmits a data reading request to the first terminal device; after receiving the data reading request, the first terminal device transmits the data in the cache space to the third terminal device.

In this embodiment of the present application, the first terminal device, the second terminal device, and the third terminal device may be a terminal device having data processing function, such as a processor, a notebook computer, a desktop computer, a mobile phone, etc. When the second terminal device transmits data to the first terminal device, the second terminal device serves as a data transmitting terminal, and the first terminal device serves as a data receiving terminal. When the first terminal device transmits data to the third terminal device, the first terminal device serves as a data transmitting terminal, and the third terminal device serves as a data receiving terminal.

It should be noted that, the first terminal device and the third terminal device may be different terminal devices, or be the same terminal device. In one application scenario, the first terminal device and the third terminal device are the same terminal device. In this condition, a data transmission process between the first terminal device and the third terminal device may be implemented as a process of using one application of the first terminal device to read data from a cache space in the first terminal device. As an example, the second terminal device is a server a of an application appl, and the first terminal device is a processor c in a terminal device b in which the application appl is installed. When the application appl needs to obtain data from the server a, the processor c obtains the data from the server a in a serial port communication manner, and stores the data obtained from the server a in a cache space of the terminal device b. Then, the processor c transmits the data in the cache space to a memory space occupied by the application in a software transmission manner (such as a process).

Figure 2:
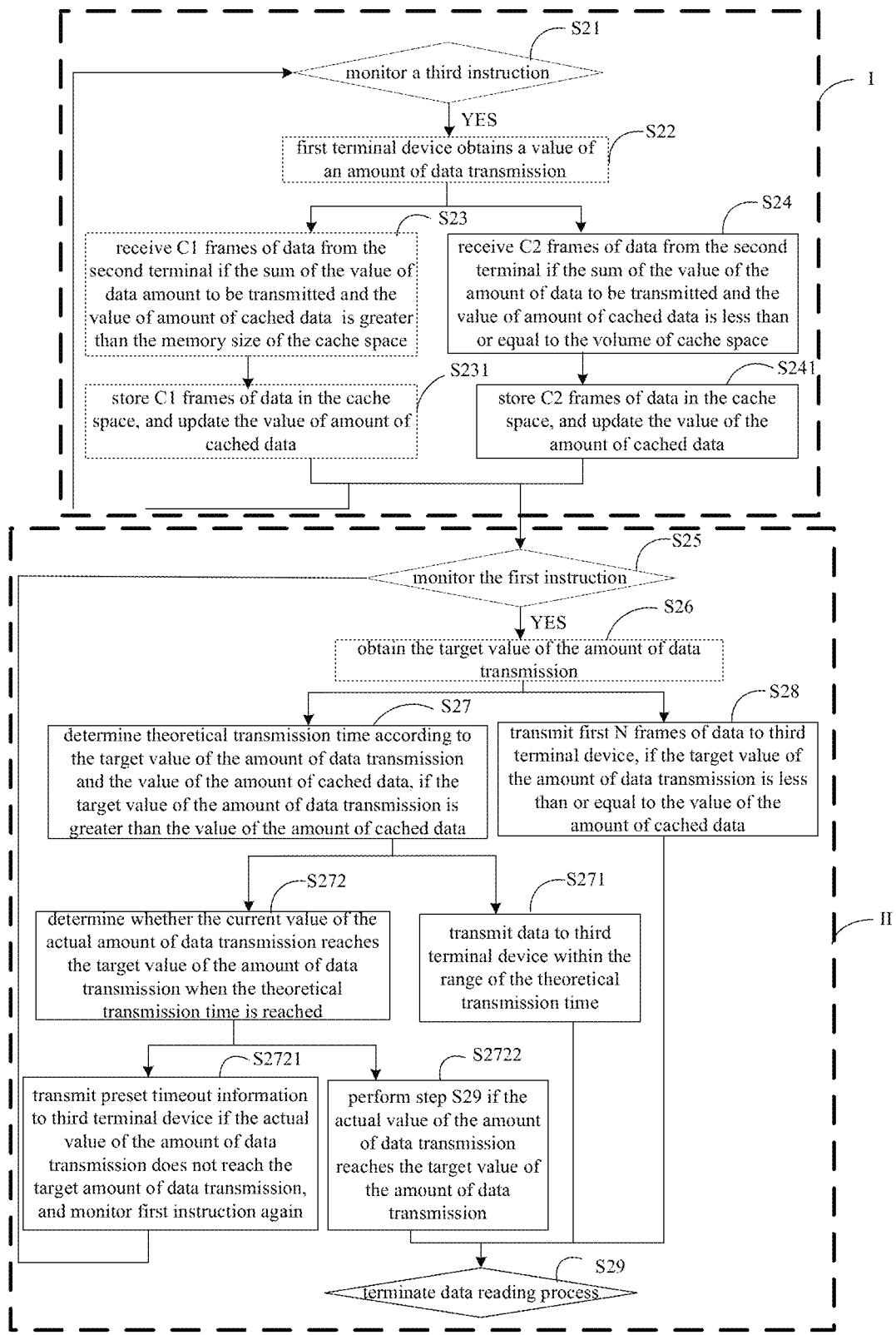
FIG. 2 illustrates a schematic flow diagram of a method for data transmission provided by one embodiment of the present application.

FIG. 2 illustrates a schematic flow diagram of the method for data transmission according to one embodiment of the present application. In this embodiment of the present application, the method for data transmission includes two parts including a data receiving and caching process I and a data reading process II. The data receiving and caching process refers to a process in which the second terminal device transmits data to the first terminal device, and the first terminal device stores the received data in the cache space thereof. The data reading process refers to a process in which the first terminal device transmits the data stored in the cache space to the third terminal device. The steps in this embodiment of the present application are described by using the first terminal device as an executive subject.

First, the data receiving and caching process is introduced. By way of example rather than limitation, the data receiving and caching process may include the following steps:

In a step of S21, the third instruction is monitored by the first terminal device.

The third instruction in this embodiment of the present application may represent the data transmitting request which is sent by the second terminal device to the first terminal device. Certainly, the third instruction may also be consent request information which is returned by the second terminal device to the first terminal device after the first terminal device actively transmits the data acquisition request to the second terminal device.

Optionally, when the third instruction is monitored, the first terminal device may obtain all data to be transmitted from the second terminal device firstly, and then calculate the amount of received data to obtain the amount of data to be transmitted, and then store the received data according to the available memory size of the cache space of the first terminal device.

As an example, assuming that the cache space in the first terminal device is the hard disk in the first terminal device. When the second terminal device requests to transmit data to the first terminal device, the first terminal device obtains all data to be transmitted from the second terminal device firstly and stores the data in the memory of the first terminal device, and then calculates the amount of the received data to be 70 frames (i.e., the amount of data to be transmitted). Assuming that the available memory size of the cache space of the first terminal device is 40 frames at this time, the first 40 frames of data in the received data in the memory of the first terminal device is stored in the cache space; then, the remaining 30 frames of data in the received data are deleted.

In the aforesaid data transmission mode, the first terminal device needs to obtain all data to be transmitted from the second terminal device, and then stores data selectively according to the available memory size of the cache space. This data transmission mode may increase data transmission time.

In order to reduce the data transmission time and improve the data transmission efficiency, optionally, the first terminal device may first determine the available memory size of the cache space, and then selectively receive data from the second terminal device according to the available memory size. The details are shown in the following steps.

In a step of S22, when the third instruction is monitored by the first terminal device, the amount of data to be transmitted is obtained by the first terminal device.

The amount of data to be transmitted is the amount of data requested to be transmitted to the second terminal device from the first terminal device.

The third instruction may include the amount of data to be transmitted. As an alternative, after the first terminal device monitors the third instruction, the amount of data to be transmitted is obtained from the second terminal device.

In the step of S23, C1 frames of data are received from the second terminal device if the sum of the amount of data to be transmitted and the value of the amount of cached data is greater than the memory size of the cache space.

C1 is a difference value between the memory size of the cache space and the value of the amount of cached data.

In a step of S231, the C1 frames of data are stored in the cache space, and the value of the amount of cached data is updated.

A step of S21 and a step of S25 are executed.

For example, assuming that the amount of data to be transmitted obtained by the first terminal device is 70 frames, the value of the amount of cached data is 40 frames, and the memory size of the cache space is 100 frames, that is, the sum of the amount of data to be transmitted and the value of the amount of cached data is greater than the memory size of the cache space. In this condition, the available memory size of the cache space is determined to be C1=(100−40) frames=60 frames, 60 frames of data are received from the second terminal device, and the 60 frames of data are stored in the cache space according to a receiving sequence. The value of the amount of cached data is updated to 100 (40+60) frames. The third instruction is then continued to be monitored, while a data read event is monitored.

In a step of S24, if the sum of the amount of data to be transmitted and the value of the amount of cached data is less than or equal to the memory size of the cache space, C2 frames of data are received from the second terminal device.

C2 is the amount of data to be transmitted.

In a step of S241, the C2 frames of data are stored in the cache space, and the value of the amount of cached data is updated.

The step S21 is executed, the third instruction is continued to be monitored, and a step of S25 is executed.

As an example, assuming that the amount of data to be transmitted obtained by the first terminal device is 70 frames, the value of the amount of cached data is 20 frames, and the memory size of the cache space is 100 frames, that is, the sum of the amount of data to be transmitted and the value of the amount of cached data is less than the memory size of the cache space. In this condition, 70 frames of data are received from the second terminal device, and the 70 frames of data are stored in the cache space according to the receiving sequence. The value of the amount of cached data is updated to 90 (20+70) frames. Then, the third instruction is continued to be monitored while the data read event is monitored.

In a step of S25, the first instruction is monitored by the first terminal device.

Monitoring the first instruction is equivalent to monitoring the data read event. In an actual application, a premise of monitoring the data read event is that data transmitted to the third terminal device is stored in the cache space. For example, when data is stored in the cache space and the data read event is monitored, the first terminal device starts the data reading process. If the cache space does not stored data, however, the data read event is monitored, or if data is stored in the cache space, however, the data read event is not monitored, the first terminal device does not start the data reading process.

Optionally, the first instruction may refer to the data reading request sent by the third terminal device to the first terminal device. In an application scenario, the cache space of the first terminal device stores data to be transmitted to the third terminal device. When the third terminal device transmits the data reading request to the first terminal device, it indicates that the first terminal device has monitored the first instruction (i.e., the data reading request).

Optionally, a flag bit for representing a data read event may be set. For example, when the flag bit is 1, it indicates that the data is stored in the cache space, and the data read event is monitored. When the flag bit is 0, it indicates that the cache space does not store data while the data read event is monitored, or indicates that the cache space stores data while the data read event is not monitored.

Based on the setting of the flag bit, the first instruction may also refer to the aforesaid flag bit. In another application scenario, the cache space of the first terminal device stores data to be transmitted to the third terminal device. When the third terminal device transmits the data reading request to the first terminal device, the flag bit is set to 1 by a monitoring process in the first terminal device. A data transmission process in the first terminal device obtains the flag bit and determines whether the flag bit is 1; if the flag bit is 1 (i.e., the first instruction is monitored), the data transmission process obtains the target value of the amount of data transmission.

The data reading process is described below. By way of example rather than limitation, the data reading process may include the following steps:

In a step of S26, when the first instruction is monitored, the target value of the amount of data transmission is obtained.

The target value of the amount of data transmission represents the amount of data requested to be acquired, which is sent by the third terminal device from the first terminal device. The first instruction may include the target value of the amount of data transmission. As an alternative, after the first instruction is monitored, the first terminal device obtains the target value of the amount of data transmission from the third terminal device.

In a step of S27, a theoretical transmission time is determined according to the target value of the amount of data transmission and the value of the amount of cached data, if the target value of the amount of data transmission is greater than the value of the amount of cached data.

The value of the amount of cached data is the volume of data stored in the cache space of the first terminal device, and the theoretical transmission time represents the theoretical time length for transmitting the data with the target value of the amount of data transmission to the third terminal device.

It should be noted that, the value of the amount of cached data is updated in real time, and the value of the amount of cached data in the step S27 refers to the amount of data stored in the cache space of the first terminal device when the theoretical transmission time is determined.

In one embodiment, the theoretical transmission time may be preset. For example, the theoretical transmission time is set according to historical data transmission time or the actual data transmission requirements. However, this method cannot estimate the time used for data transmission, a higher failure rate of data transmission is caused.

In order to improve the success rate of data transmission, in one embodiment, the method of calculation of the theoretical transmission time may include the following steps:

obtaining a plurality of communication parameters between the first terminal device and the second terminal device; determining a difference value between the target value of the amount of data transmission and the value of the amount of cached data; and determining the theoretical transmission time according to the communication parameters and the difference value.

Due to the fact that the target value of the amount of data transmission is greater than the value of the amount of cached data, that is, the amount of data that needs to be acquired by the third terminal device is greater than the amount of data that has been stored in the cache space of the first terminal device, the first terminal device still needs to continue to obtain data from the second terminal device. The theoretical transmission time includes the time period during which the first terminal device continues to obtain data from the second terminal device.

The theoretical transmission time determined according to the communication parameters is very accurate, and the condition of data transmission failure may be effectively avoided.

Optionally, the communication parameters include a baud rate and data bits included in each frame of data.

Figure 3:
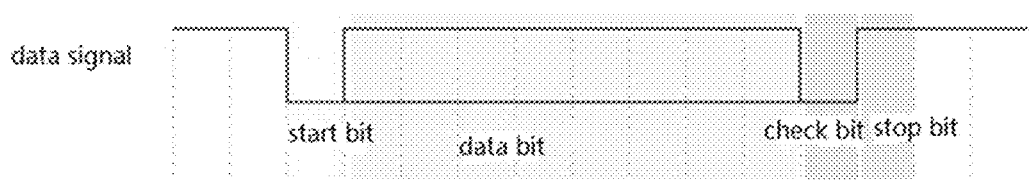
FIG. 3 illustrates a schematic diagram of a data signal provided by one embodiment of the present application.

Serial port communication is asynchronous communication, and data frame format and the baud rate of two communication parties need to be consistent to ensure normal data transmission. The baud rate refers to a length of symbols transmitted per second between the communication devices in a serial port communication process. One frame of data generally includes a start bit, a data bit, a check bit, and a stop bit, and the sum of the number of bits of all data in one frame of data is the number of data bits contained in each frame of data. Referring to FIG. 3, FIG. 3 is a schematic diagram of a data signal according to one embodiment of the present application. In one frame of data as shown in FIG. 3, the start bit has 1 bit, the data bits has 8 bits, the check bit has 1 bit, and the stop bit has 1 bit, therefore, the number of data bits contained in this frame of data is (1+8+1+1) bits=11 bits.

Correspondingly, the method of determining the theoretical transmission time according to the communication parameters and the difference value may include:

The unit transmission time between the first terminal device and the second terminal device is determined according to the baud rate and the number of data bits contained in each frame of data, and the theoretical transmission time is determined according to the unit transmission time and the difference value.

The unit transmission time represents the time required for transmitting each frame of data. In particular, the unit transmission time may be determined according to a formula of $$Tc = BC \times \frac{1}{DU}.$$

Then, the theoretical transmission time is determined according to the formula of T=D×Tc. Where, Tc represents the unit transmission time, BC represents the number of data bits included in each frame of data, DU represents the baud rate, and D represents the difference value.

In the data transmission process, not only time is spent on the data transmission between the first terminal device and the second terminal device, time is also spent on transmitting data from the first terminal device to the third terminal device. However, in the aforesaid calculation method, the time spent on transmitting data between the first terminal device and the third terminal device and delay time in the data transmission process are not considered, as a result, the determined theoretical transmission time is shorter, and the probability of data transmission failure is increased.

In order to solve the above problem, furthermore, the communication parameters further include a tolerance time. The tolerance time in this embodiment of the present application may be set according to the time for transmitting data between the first terminal device and the third terminal device, the delay time caused due to overload, system call delay time and/or network delay time.

Correspondingly, the method of determining the theoretical transmission time according to the unit transmission time and the difference value may include: determining a first transmission time according to the difference value and the unit transmission time; and determining the theoretical transmission time according to the first transmission time and the tolerance time.

In particular, the theoretical transmission time is determined according to the formula of T=D×Tc+Ts, where Ts represents the tolerance time.

When the theoretical transmission time is determined, the tolerance time is considered, the probability of data transmission success is effectively improved, and the reliability of data transmission is improved.

In the step of S271, within the range of the theoretical transmission time, data is transmitted to the third terminal device according to the target value of the amount of data transmission and the value of the amount of cached data.

In an actual application, when data is started to be transmitted to the third terminal device, a timer may be activated. Within the range of theoretical transmission time means that the time recorded by the timer is less than the theoretical transmission time. On the contrary, the exceeding of the range of the theoretical transmission time means that the time recorded by the timer reaches the theoretical transmission time.

In one embodiment, the step S271 may further include:

At step 1) the second instruction is monitored by the first terminal device.

In this embodiment of the present application, the data receiving and caching process and the data reading process may be processed in parallel, that is, when the first terminal device executes the data reading process, the data caching process may be executed at the same time. In other words, when the first terminal device transmits the data in the cache space to the third terminal device, the first terminal device may continue to obtain data from the second terminal device and store the data in the unoccupied storage area in the cache space. Thus, the second instruction indicates that new data is added into the cache space of the first terminal device. In this condition, it is necessary to determine whether the newly stored data in the cache space is the data that needs to be transmitted to the third terminal device. The details are shown in the following steps.

At step 2) when the second instruction is monitored, the current value of the actual amount of data transmission and the value of the amount of cached data are obtained.

The actual amount of data transmission refers to the amount of data that has been transmitted to the third terminal device through the first terminal device. The value of the amount of cached data herein refers to the amount of data stored in the cache space when the second instruction is monitored.

At step 3) the remaining amount of data transmission is determined according to the target value of the amount of data transmission and the actual amount of data transmission.

At step 4) if the remaining amount of data transmission is less than or equal to the value of the amount of cached data, the first M frames of data in the cache space are transmitted to the third terminal device, the value of the amount of cached data is updated, and the data transmission is terminated.

M is the remaining amount of data transmission.

Returning to the step 1), it is continued to monitor the second instruction.

As an example, assuming that the target value of the amount of data transmission is 80 frames, the current value of the actual amount of data transmission is 30 frames, and the current cached data amount is 90 frames, the remaining amount of data transmission is (80−30) frames=50 frames, that is, 50 frames of data need to be transmitted to the third terminal device. The cache space stores 50 frames of data, which indicates that the first 50 frames of data in the 90 frames of data only needs to be transmitted to the third terminal device.

At step 5) if the remaining amount of data transmission is greater than the value of the amount of cached data, Q frames of data in the cache space are transmitted to the third terminal device, the value of the amount of cached data is updated, and it is continued to monitor the second instruction.

Q is the value of the amount of cached data.

Returning to step 1), and continuing to monitor the second instruction.

For example, assuming that the target value of the amount of data transmission is 80 frames, the current value of the actual amount of data transmission is 30 frames, and the current value of cached data is 40 frames, the remaining amount of data transmission is (80−30) frames=50 frames, that is, 50 frames of data needs to be transmitted to the third terminal device. However, 40 frames of data are only stored in the cache space currently, after all of the 40 frames of data are transmitted to the third terminal device, the first terminal device still needs to continue to obtain data from the second terminal device. Thus, the second instruction needs to be continuously monitored.

It should be noted that, in this embodiment of the present application, the manner of storing/reading data in the cache space may be in accordance with a first-in first-out (FIFO) manner. In particular, when data is stored, the sequence of the data entering the cache space is the first frame of data→the second-frames of data→the third-frames of data. When data is read, the sequence of the data reading out from the cache space is still the first frame of data→the second frame of data→the third frame of data. Certainly, the manner of storing/reading data in the cache space may also be in accordance with a first-in last-out (FILO) manner. In this condition, the subsequent data needs to be stored first, then, the previous data is stored. In particular, when data is stored, the sequence of the data entering the cache space is the third frame of data→the second frame of data→the first frame of data. When the data is read out, the sequence of the data reading out from the cache space is the first frame of data→the second-frame of data→the third frame of data.

In a step of S272, when the time recorded by the timer reaches the theoretical transmission time, whether the current value of the actual amount of data transmission reaches the target value of the amount of data transmission is determined.

The value of the actual amount of data transmission represents the value of the amount of the data that has been transmitted to the third terminal device through the first terminal device.

In a step of S2721, if the actual amount of data transmission does not reach the target value of the amount of data transmission, preset timeout information is transmitted to the third terminal device, and the first instruction is monitored again.

After receiving the preset timeout information, the third terminal device does not need to continue to wait to receive data; instead, the third terminal device may perform other tasks. The flexibility of data transmission is effectively improved.

In a step of S2722, if the actual amount of data transmission reaches the target value of the amount of data transmission, a step of S29 is executed.

In a step of S28, if the target value of the amount of data transmission is less than or equal to the value of the amount of cached data, the first N frames of data in the cache space are transmitted to the third terminal device.

Where, N is the target value of the amount of data transmission.

In this condition, it is indicated that the amount of data stored in the cache space meets the data reading requirement of the third terminal device, and the first terminal device does not need to continue to obtain new data from the second terminal device.

In the step of S29, the data reading process is terminated.

It should be understood that, the values of serial numbers of the steps in the aforesaid embodiments do not indicate an order of execution sequences of the steps; instead, the execution sequences of the steps should be determined by functionalities and internal logic of the steps, and thus shouldn't be regarded as limitation to implementation processes of the embodiments of the present application.

Figure 4:
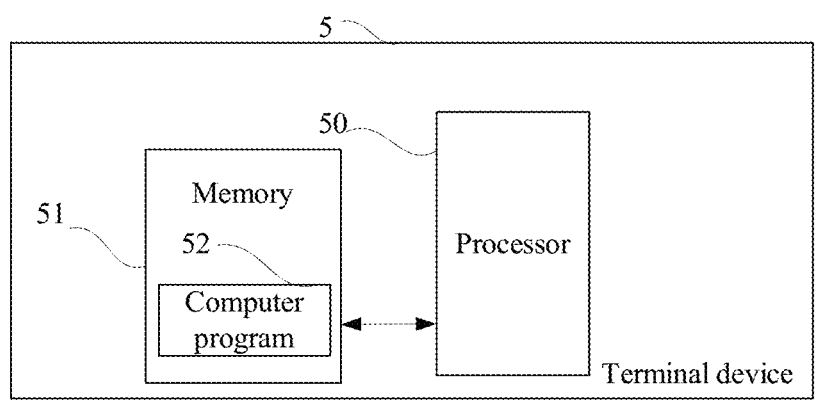
FIG. 4 illustrates a schematic structural diagram of a terminal device provided by one embodiment of the present application.

FIG. 4 illustrates a schematic structural diagram of a terminal device 5 provided by one embodiment of the present application. The terminal device 5 includes: at least one processor 50 (only one processor is shown in FIG. 4), a memory 51, and a computer program 52 stored in the memory 51 and executed by the at least one processor 50. The processor 50 is configured to, when executing the computer program 52, implement steps of the various method embodiments for data transmission as described above.

The terminal device 5 can be a computing device such as a desktop computer, a laptop computer, a palm computer, a cloud server, etc. The terminal device 5 may include, but is not limited to: the processor, the memory. A person of ordinary skill in the art can understand that, FIG. 4 is only one example of the terminal device 5, but should not be constituted as limitation to the terminal device 5, more or less components than the components shown in FIG. 4 may be included. Some components or different components may be combined. For example, the terminal device 5 may also include an input and output device, a network access device, etc.

The so-called processor 50 may be central processing unit (CPU), and may also be other general purpose processor, digital signal processor (DSP), application specific integrated circuit (ASIC), field-programmable gate array (FGPA), or some other programmable logic devices, discrete gate or transistor logic device, discrete hardware component, etc. The general purpose processor may be a microprocessor, as an alternative, the processor may also be any conventional processor, or the like.

In some embodiments, the memory 51 may be an internal storage unit of the terminal device 5, such as a hard disk or a memory of the terminal device 5. In some other embodiments, the memory 51 may also be an external storage device of the terminal device 5, such as a plug-in hard disk, a SMC (Smart Media Card), a SD (Secure Digital) card, a FC (Flash Card) equipped on the terminal device 5. Furthermore, the memory 51 may not only include the internal storage unit of the terminal device 5, but also include the external memory of the terminal device 5. The memory 51 is configured to store operating systems, applications, Boot Loader, data and other procedures, such as program codes of the compute program, etc. The memory 51 may also be configured to store data that has been output or being ready to be output temporarily.

A non-transitory computer-readable storage medium is further provided in one embodiment of the present application. The non-transitory computer-readable storage medium store a computer program, that, when executed by the processor 50 of the terminal device 5, causes the processor 50 of the terminal device 5 to perform the steps in the various method embodiments.

A computer program product is further provided in one embodiment of the present application. The computer program product is configured to, when being executed on the terminal device, causes the terminal device to perform the steps in the various method embodiments.

The aforesaid embodiments are merely used to illustrate the technical solutions of the present application, and are not intended to limit the technical solutions of the present application. Although the present application has been described in detail with reference to the embodiments described above, the person of ordinary skill in the art should understand that the technical solutions described in these embodiments may still be modified, or some or all technical features in the embodiments may be equivalently replaced. However, these modifications or replacements do not make the essences of corresponding technical solutions to deviate from the spirit and the scope of the technical solutions of the embodiments of the present application, and thus should all be included in the protection scope of the present application.

What is claimed is:

1. A method for data transmission, which is applied to a first terminal device, wherein the first terminal device is configured to store data received from a second terminal device into a cache space of the first terminal device, and transmit the data stored in the cache space to a third terminal device, the method comprises:

obtaining a target value of an amount of data transmission from the third terminal device when a data read event is monitored, wherein the target value of the amount of data transmission indicates a value of an amount of data requested to be acquired, and the target value of the amount of data transmission is sent from the third terminal device to the first terminal device;

determining, if the target value of the amount of data transmission is greater than a value of an amount of cached data, a theoretical transmission time according to the target value of the amount of data transmission and the value of the amount of cached data, wherein the value of the amount of cached data is the value of the amount of data cached in the cache space of the first terminal device, and the theoretical transmission time represents a theoretical period of time for transmitting data having the target value of the amount of data transmission to the third terminal device; and transmitting data to the third terminal device according to the target value of the amount of data transmission and the value of the amount of cached data within a range of the theoretical transmission time.

2. The method for data transmission according to claim 1, wherein said determining the theoretical transmission time according to the target value of the amount of data transmission and the value of the amount of cached data comprises:

obtaining a plurality of communication parameters between the first terminal device and the second terminal device;

determining a data amount difference value between the target value of the amount of data transmission and the value of the amount of cached data; and determining the theoretical transmission time according to the communication parameters and the data amount difference value.

3. The method for data transmission according to claim 2, wherein the communication parameters includes a baud rate and a number of data bits included in each frame of data;

said determining the theoretical transmission time according to the communication parameters and the data amount difference value comprises:

determining a unit transmission time between the first terminal device and the second terminal device according to the baud rate and the number of data bits included in each frame of data, wherein the unit transmission time represents a time for transmitting each frame of data; and determining the theoretical transmission time according to the unit transmission time and the data amount difference value.

4. The method for data transmission according to claim 3, wherein the communication parameters further comprise a tolerance time;
said determining the theoretical transmission time according to the unit transmission time and the data amount difference value comprises:
determining a first transmission time according to the data amount difference value and the unit transmission time; and
determining the theoretical transmission time according to the first transmission time and the tolerance time.

5. The method for data transmission according to claim 1, wherein said transmitting the data to the third terminal device according to the target value of the amount of data transmission and the value of the amount of cached data within the range of the theoretical transmission time comprises:
obtaining, when a second instruction is monitored, a current value of an actual amount of data transmission and the value of the amount of cached data within the range of the theoretical transmission time, wherein a value of the actual amount of data transmission represents a value of an amount of data that has been transmitted to the third terminal device through the first terminal device;
determining a remaining amount of data transmission according to the target value of the amount of data transmission and the actual amount of data transmission; and
transmitting, if the remaining amount of data transmission is less than or equal to the value of the amount of cached data, first M frames of data in the cache space to the third terminal device, updating the value of the amount of cached data, and terminating data transmission; wherein M is the remaining amount of data transmission; or
transmitting, if the remaining amount of data transmission is greater than the value of the amount of cached data, Q frames of data in the cache space to the third terminal device, updating the value of the amount of cached data, and continuing to monitor the second instruction; wherein Q is the value of the amount of cached data.

6. The method for data transmission according to claim 1, wherein after said determining the theoretical transmission time according to the target value of the amount of data transmission and the value of the amount of cached data, the method further includes:
determining whether a current value of an actual amount of data transmission reaches the target value of the amount of data transmission when a time recorded by a timer reaches the theoretical transmission time, wherein the timer is activated when data is started to be transmitted to the third terminal device, wherein the value of the actual amount of data transmission represents the value of the amount of data transmitted to the third terminal device through the first terminal device; and
transmitting, if the actual amount of data transmission does not reach the target value of the amount of data transmission, preset timeout information to the third terminal device, and monitoring the data read event again.

7. The method for data transmission according to claim 1, wherein after obtaining the target value of the amount of data transmission, the method further comprises:
transmitting, if the target value of the amount of data transmission is less than or equal to the value of the amount of cached data, first N frames of data in the cache space to the third terminal device; wherein N is the target value of the amount of data transmission.

8. The method for data transmission according to claim 1, further comprising:
obtaining an amount of data to be transmitted when a third instruction is monitored; wherein the amount of data to be transmitted is an amount of data requested to be transmitted, which is sent by the second terminal device to the first terminal device;
receiving C1 frames of data from the second terminal device if a sum of the amount of data to be transmitted and the value of the amount of cached data is greater than a memory size of the cache space; wherein C1 is a difference value between the memory size of the cache space and the value of the amount of cached data; and
storing the C1 frames of data in the cache space, and updating the value of the amount of cached data.

9. A first terminal device, comprising a memory, a processor and a computer program stored in the memory and executed by the processor, wherein the processor is configured to, when executing the computer program, implement steps of a method for data transmission, comprising:
obtaining a target value of an amount of data transmission from a third terminal device when a data read event is monitored, wherein the target value of the amount of data transmission indicates a value of an amount of data requested to be acquired, and the target value of the amount of data transmission is sent from the third terminal device to the first terminal device;
determining, if the target value of the amount of data transmission is greater than a value of an amount of cached data, a theoretical transmission time according to the target value of the amount of data transmission and the value of the amount of cached data, wherein the value of the amount of cached data is the value of the amount of data cached in a cache space of the first terminal device, and the theoretical transmission time represents a theoretical period of time for transmitting data having the target value of the amount of data transmission to the third terminal device; and
transmitting data to the third terminal device according to the target value of the amount of data transmission and the value of the amount of cached data within a range of the theoretical transmission time.

10. A non-transitory computer-readable storage medium, which stores a computer program, that, when executed by a processor of a terminal device, causes the processor of the terminal device to implement steps of the method for data transmission according to claim 1.

11. The first terminal device according to claim 9, wherein the processor is further configured to perform the step of determining the theoretical transmission time according to the target value of the amount of data transmission and the value of the amount of cached data by:
obtaining a plurality of communication parameters between the first terminal device and a second terminal device;
determining a data amount difference value between the target value of the amount of data transmission and the value of the amount of cached data; and determining the theoretical transmission time according to the communication parameters and the data amount difference value.

12. The first terminal device according to claim 11, wherein the communication parameters includes a baud rate and a number of data bits included in each frame of data;
the processor is further configured to perform the step of determining the theoretical transmission time according to the communication parameters and the data amount difference value by:
determining a unit transmission time between the first terminal device and the second terminal device according to the baud rate and the number of data bits included in each frame of data, wherein the unit transmission time represents a time for transmitting each frame of data; and
determining the theoretical transmission time according to the unit transmission time and the data amount difference value.

13. The first terminal device according to claim 12, wherein the communication parameters further comprise a tolerance time;
the processor is further configured to perform the step of determining the theoretical transmission time according to the unit transmission time and the data amount difference value by:
determining a first transmission time according to the data amount difference value and the unit transmission time; and
determining the theoretical transmission time according to the first transmission time and the tolerance time.

14. The first terminal device according to claim 9, wherein the processor is further configured to perform the step of transmitting the data to the third terminal device according to the target value of the amount of data transmission and the value of the amount of cached data within the range of the theoretical transmission time by:
obtaining, when a second instruction is monitored, a current value of an actual amount of data transmission and the value of the amount of cached data within the range of the theoretical transmission time, wherein a value of the actual amount of data transmission represents a value of an amount of data that has been transmitted to the third terminal device through the first terminal device;
determining a remaining amount of data transmission according to the target value of the amount of data transmission and the actual amount of data transmission; and
transmitting, if the remaining amount of data transmission is less than or equal to the value of the amount of cached data, first M frames of data in the cache space to the third terminal device, updating the value of the amount of cached data, and terminating data transmission; wherein M is the remaining amount of data transmission; or
transmitting, if the remaining amount of data transmission is greater than the value of the amount of cached data, Q frames of data in the cache space to the third terminal device, updating the value of the amount of cached data, and continuing to monitor the second instruction; wherein Q is the value of the amount of cached data.

15. The first terminal device according to claim 9, wherein after the step of determining the theoretical transmission time according to the target value of the amount of data transmission and the value of the amount of cached data, the processor is further configured to perform steps of determining whether a current value of an actual amount of data transmission reaches the target value of the amount of data transmission when a time recorded by a timer reaches the theoretical transmission time, wherein the timer is activated when data is started to be transmitted to the third terminal device, wherein a value of the actual amount of data transmission represents a value of an amount of data transmitted to the third terminal device through the first terminal device; and transmitting, if the actual amount of data transmission does not reach the target value of the amount of data transmission, preset timeout information to the third terminal device, and monitoring the data read event again.

16. The first terminal device according to claim 9, wherein after the target value of the amount of data transmission is obtained, the processor is further configured to perform a step of transmitting first N frames of data in the cache space to the third terminal device if the target value of the amount of data transmission is less than or equal to the value of the amount of cached data; wherein N is the target value of the amount of data transmission.

17. The first terminal device according to claim 9, wherein the processor is further configured to perform steps of obtaining an amount of data to be transmitted when a third instruction is monitored, wherein the amount of data to be transmitted is an amount of data requested to be transmitted, which is sent by a second terminal device to the first terminal device; receiving C1 frames of data from the second terminal device if a sum of the amount of data to be transmitted and the value of the amount of cached data is greater than a memory size of the cache space, wherein C1 is a difference value between the memory size of the cache space and the value of the amount of cached data; and storing the C1 frames of data in the cache space, and updating the value of the amount of cached data.

* * * * *